United States Patent Office 3,290,299
Patented Dec. 6, 1966

3,290,299
COPPER CHELATE PIGMENTS AND PROCESS
OF MAKING THEM
Charles A. Kumins, Chappaqua, and Edmund N. Harvey, Jr., Scarsdale, N.Y., and George A. Weber, North Bergen, N.J., assignors to Interchemical Corporation, New York, N.Y., a corporation of Ohio
No Drawing. Filed June 26, 1963, Ser. No. 290,595
3 Claims. (Cl. 260—240)

This invention relates to pigments and to methods for preparing them. More particularly it relates to copper chelates useful as pigments and to their preparation.

It has been found that valuable transparent red pigments may be made by reacting copper salts with 2,4-diamino-6-phenyl-s-triazine. The pigments have excellent lightfastness in most vehicles and do not bleed into any of the solvents tried. When dispersed on 2-roll or 3 roll mills, the pigments yield dispersions having excellent transparency in clear plastic films, in inks, and in coatings on metallic substrates. Colors range from a bluish coppery tone to maroon, depending on the concentration.

The exact structural formula of the pigment is not known, but it is believed to be

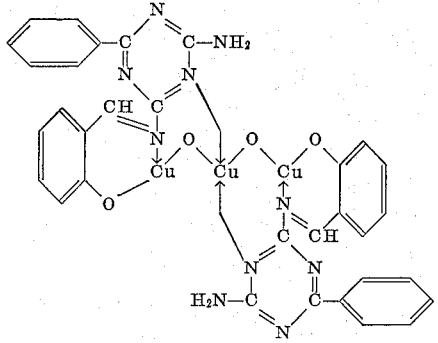

The pigments may also be made by first combining copper with the aldehyde and then reacting the product with the triazine.

Although the reaction goes without solvent, we prefer to conduct the synthesis in the presence of an organic solvent that is capable of dissolving at least a reasonable amount of the copper salt and that is a solvent for the triazine used. The solvent should also be a reasonably high boiling one, certainly well over 100° C. Besides the solvents and diluents illustrated in the examples, diethylene glycol, bis-(2-ethoxyethyl)ether, and 2-ethylhexanol, other solvents that fulfill the requirements may be used. Other diluents may also be used in place of the aliphatic hydrocarbon of Example 1.

Example 1

A mixture of 0.1 mole of 2,4-diamino-6-phenyl-s-triazine (18.7 g.), 0.15 mole of cupric acetate monohydrate (30.0 g.), 0.1 mole of salicyladehyde (12.2 g.), and 1000 ml. of "#535 Solvent" (an aliphatic hydrocarbon liquid having a boiling range of 277–312° C. and a kauri-butanol value of 27.5) was refluxed about 20 hours. The batch was then cooled to room temperature, filtered, and washed with benzene to remove the "#535 Solvent." The pigment was washed with ammonia (3% NH₃) followed by washing with hot water and subsequent oven drying at 60° C. overnight.

Example 2

A mixture of 0.1 mole of 2,4-diamino-6-phenyl-s-triazine (18.7 g.), 0.15 mole of cupric acetate monohydrate (30.0 g.), and 500 ml. bis-(2-ethoxyethyl)ether was heated to 55° C. and then 0.1 mole of salicylaldehyde (12.2 g.) was added. The batch was then refluxed (150° C.) one hour. About 100 ml. of methanol were added to dilute the reaction product, which was cooled to about room temperature, filtered, washed with methanol, washed with water, and finally dried at about 60° C. overnight.

Example 3

The procedure of Example 2 was repeated, but using 2-ethyl hexanol instead of the ether as a solvent.

Example 4

The procedure of Example 2 was repeated, using diethylene glycol instead of the ether as a solvent. The color changed to brown at 135° C., then to red at 150° C. The temperature reached 178° C. and remained at that point until the reaction was finished. The material was here diluted with water, rather than methanol at the end of the reaction.

Example 5

6.5 g. salicylaldehyde were added to 5.0 g. of 2,4-diamino-6-phenyl-s-triazine and refluxed ½ hour until the material initially formed, presumed to be the Schiff's base, went into solution. 5.5 g. of cupric acetate monohydrate were added and the resulting mixture, very viscous at this point, refluxed half an hour. 5.0 g. more of salicylaldehyde were then added and refluxing continued for half an hour more. The material was diluted with ethanol, shaken with water, and dried at about 60° C. The pigment was light maroon in color.

Example 6

A mixture of 0.3 mole of 2,4-diamino-6-phenyl-s-triazine (56.1 g.), 0.45 mole of cupric acetate monohydrate (90.0 g.), 0.3 mole of salicylaldehyde (36.6 g.), and 3000 ml. of 2-ethylhexanol was heated to 145° C. and refluxed 2 hours. About 300 ml. of ethanol were added as diluent and the batch was cooled to about room temperature. It was then filtered and the Büchner funnel sucked dry to remove most of the 2-ethylhexanol. The product was reslurried in ethanol, filtered, and washed with ethanol followed by hot ammonia water (about 3% NH₃) until the blue-colored solution became colorless. The pigment was washed well with water and oven dried at 60° C. overnight.

Example 7

A mixture of 0.1 mole copper bis-salicylaldehyde (30.5 g.), 0.1 mole of 2,4-diamino-6-phenyl-s-triazine (18.7 g.), and 1500 ml. of 2-ethylhexanol was heated to 175° C. and refluxed 2 hours. The procedure was thereafter the same as in example 6 at a similar stage, except that the batch was cooled to only 100° C. and then filtered, etc.

In the foregoing example, copper bis-salicylaldehyde was prepared according to the procedure outlined in "Inorganic Synthesis," vol. II, page 14 (W. C. Fernelius, editor) by Louis Marchi.

The separated and dried colorants have a chemical composition of about 23.8 parts copper, 2.8 parts hydrogen, 17.5 parts nitrogen, 48 parts carbon, and 7.9 parts oxygen, all being parts by weight.

What is claimed is:

1. A colorant consisting essentially of the reaction product of 2 moles of 2,4-diamino-6-phenyl-s-triazine, 3 moles of a neutral cupric salt soluble in the reaction medium, and 2 moles of salicylaldehyde, when heated together to about 145–300° C. for a period of from about 1 hour to about 20 hours, the separated and dried colorant having a chemical composition of about 23.8 parts copper, 2.8 parts hydrogen, 17.5 parts nitrogen, 48 parts carbon, and 7.9 parts oxygen, the parts being parts by weight.

2. A process for making a transparent red pigment consisting essentially of
   (a) reacting a mixture of 2 moles of 2,4-diamino-6-phenyl-s-triazine, 3 moles of a neutral cupric salt soluble in the reaction medium, and 2 moles of salicylaldehyde by heating to about 145–300° C. for a period of from about 1 hour to about 20 hours;
   (b) separating the pigment from the reaction mass by conventional methods, and
   (c) drying the pigment.

3. The process described in claim 2 with the further limitation that the reaction mixture contains a major proportion of an inert organic liquid selected from the group consisting of (a) an aliphatic hydrocarbon liquid having a boiling range of 277–312° C. and a kauri-butanol value of 27.5,
   (b) bis-(2-ethoxyethyl)ether,
   (c) 2-ethylhexanol, and
   (d) diethylene glycol.

References Cited by the Examiner
UNITED STATES PATENTS 3,050,461   8/1962   Luvisi _____ 260—240 X
3,211,698  10/1965   Johns _____ 260—242 X

OTHER REFERENCES 1,079,756, April 1960, German Auslegeschrift (6 pp. spec.).

JOHN D. RANDOLPH, *Primary Examiner.*